L. I. KELLY.
POWER PLANT.
APPLICATION FILED JULY 25, 1917.

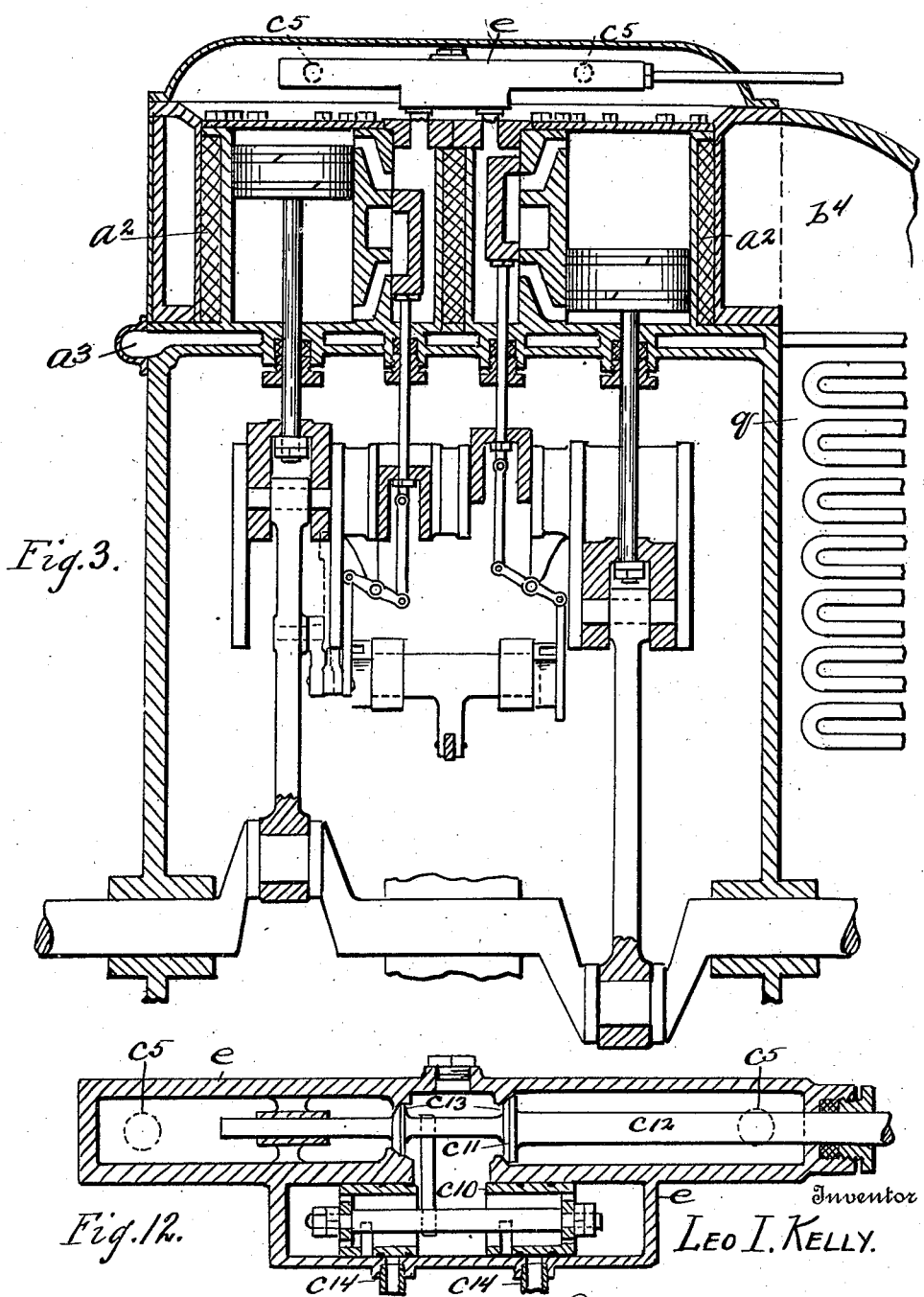

1,390,562.

Patented Sept. 13, 1921.
5 SHEETS—SHEET 4.

Inventor
Leo I. Kelly.
By Raymond A. Parker
Attorney

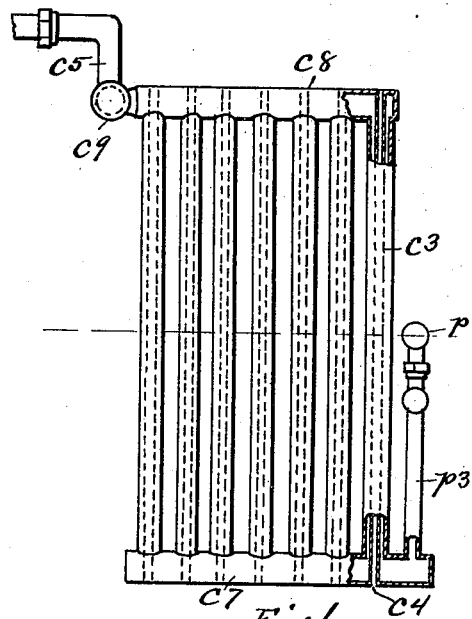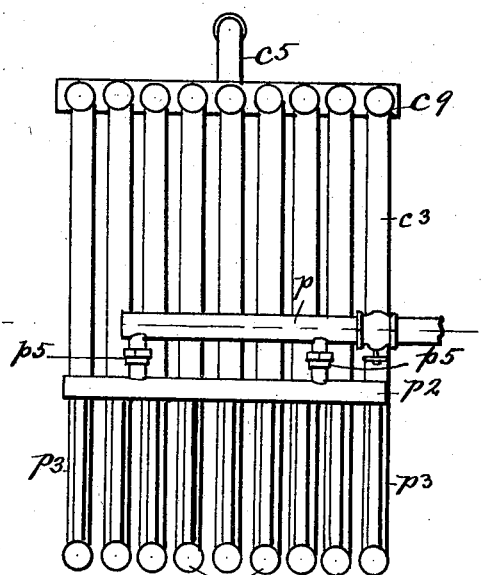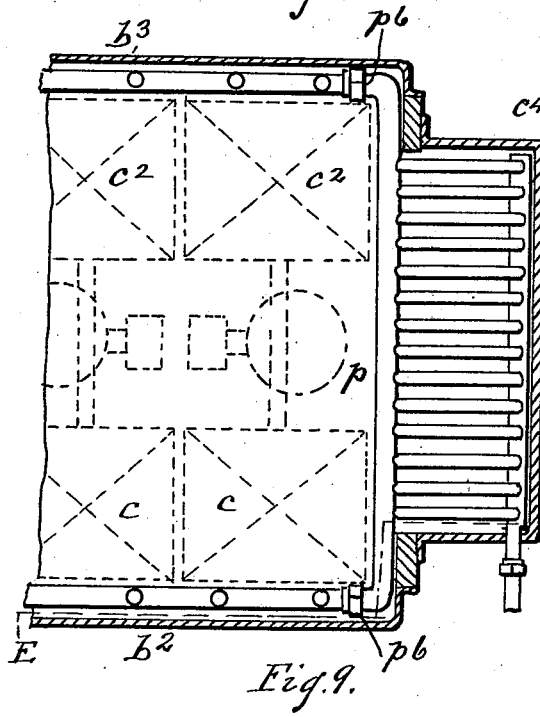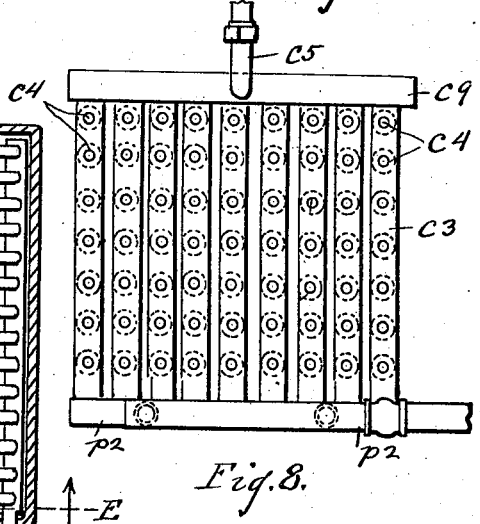

UNITED STATES PATENT OFFICE.

LEO I. KELLY, OF DETROIT, MICHIGAN.

POWER PLANT.

1,390,562.

Specification of Letters Patent. Patented Sept. 13, 1921.

Application filed July 25, 1917. Serial No. 182,622.

*To all whom it may concern:*

Be it known that I, LEO I. KELLY, a citizen of the United States, residing at Detroit, county of Wayne, State of Michigan, have invented a certain new and useful Improvement in Power Plants, and declare the following to be a full, clear, and exact description of the same, such as will enable others skilled in the art to which it pertains to make and use the same, reference being had to the accompanying drawings, which form a part of this specification.

My invention relates to power plants and a special object of my improvements is to provide an efficient power plant for generating and using steam especially adapted for use upon automobiles.

In the accompanying drawings:

Fig. 3 is a part elevation in longitudinal section on the line C—C Fig. 2.

Fig. 6 is a detail elevation showing one of the generators.

Fig. 7 is an elevation looking from the right of Fig. 6.

Fig. 8 is a plan view of the generator shown in Figs. 6 and 7.

Fig. 9 is a part end view of the generator and engine, the casing being sectioned on the line I—I Fig. 1.

Fig. 10 is a sectional view of the automatic mechanism for controlling the feed to the generators.

Fig. 11 is a sectional plan view of the condenser taken on the line K—K Fig. 1.

Fig. 12 is a detail sectional view of the throttle valve.

$a$ indicates the cylinders of the engine, which in this instance are two in number, arranged vertically and side by side. $c\ c^2$ are the generators or boilers. $b$ indicates the casing inclosing the cylinders $a$ and generators $c\ c^2$. $d$ indicates burners for vaporizing the water in the generators $c\ c^2$. These burners are also located within the casing $b$.

It is to be observed that the cylinders $a$ are inclosed directly within the same casing $b$, as are the burners $d$, and are therefore subjected directly or indirectly to the gases heated by said burners. In order to prevent the cylinders from being heated to too high a temperature I provide them with a heat obstructing cover which may be a partial heat insulating material $x$ as shown surrounding said cylinders. This insulating material may also cover the casing $b$ to prevent the escape of heat.

The casing $b$ is extended upon each side of the cylinders $a$ in two lateral chambers $b^2$ and $b^3$ in which the burners and generators or boilers $c\ c^2$ are located. The products of combustion are carried off from the interior of the casing $b$ by a flue $b^4$ leading from the back of said casing intermediate its sides.

The generators $c\ c^2$ are of the tubular kind, each of the sections thereof consisting of horizontal manifolds $c^7$ and $c^8$ united by tubes $c^3$, welded to said manifolds, through which tubes pass smaller tubes $c^4$ which open through the walls of the manifolds $c^7$ and $c^8$, so that the hot gases may pass through said smaller tubes to assist in the heating of the water between the tubes $c^3$ and $c^4$. $c^5$ indicates the feed pipe for steam leading to the throttle valve apparatus $e$, which I prefer to make of the construction shown in Fig. 12 in which there is an operating valve stem $c^{12}$ adapted to open and close the partly balanced valves $c^{13}$ and to move the piston valves $c^{10}$ which are balanced to control the supply of steam to the engine through the passages $c^{14}$. The water is supplied to the generator through a pipe $p$ leading to a manifold $p^2$ which distributes it through a number of small pipes $p^3$ which pipes open into a manifold $c^7$ of the generator.

Figure 1:
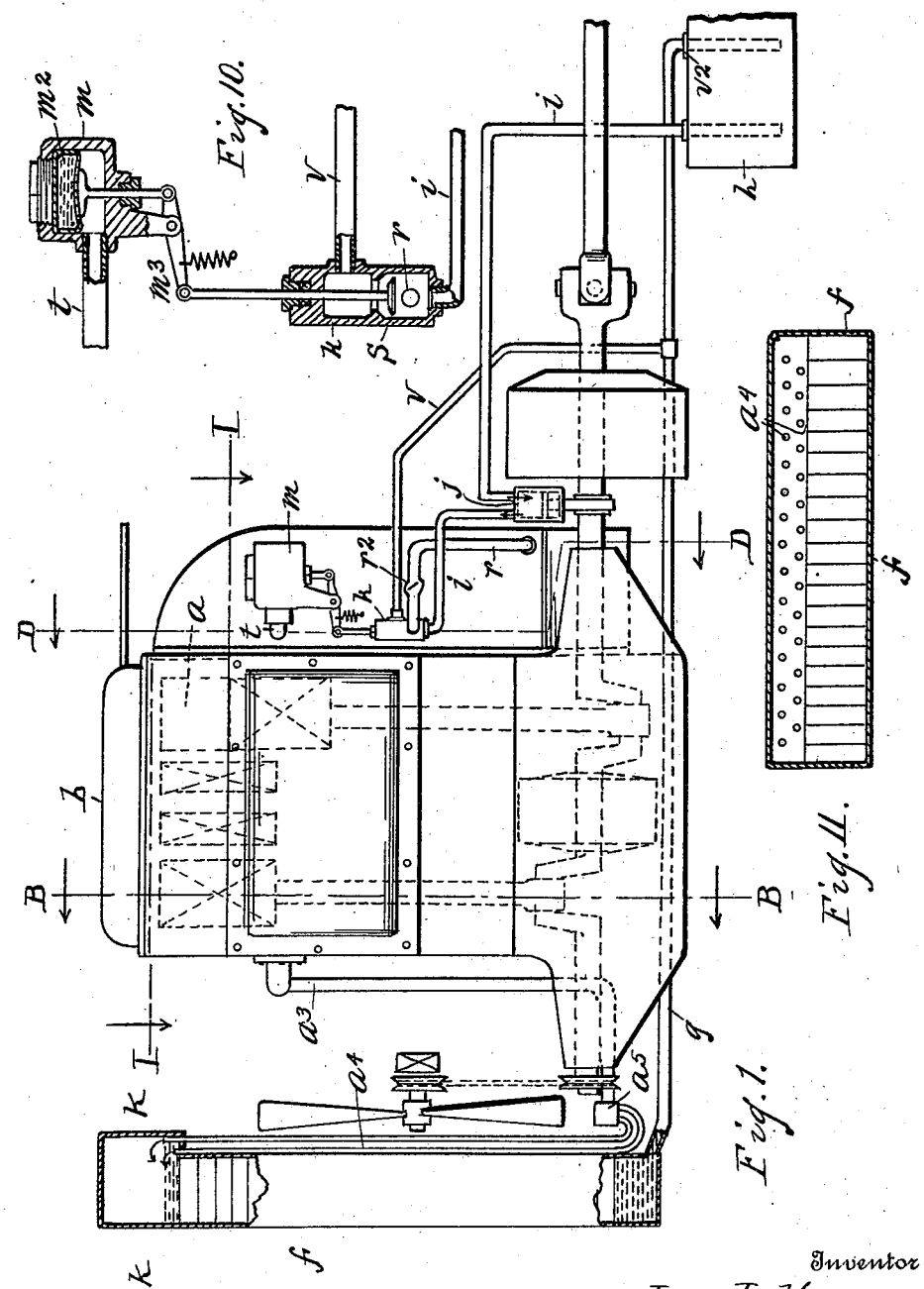
Figure 1 is a side elevation of a power plant embodying my invention.
Figure 2:
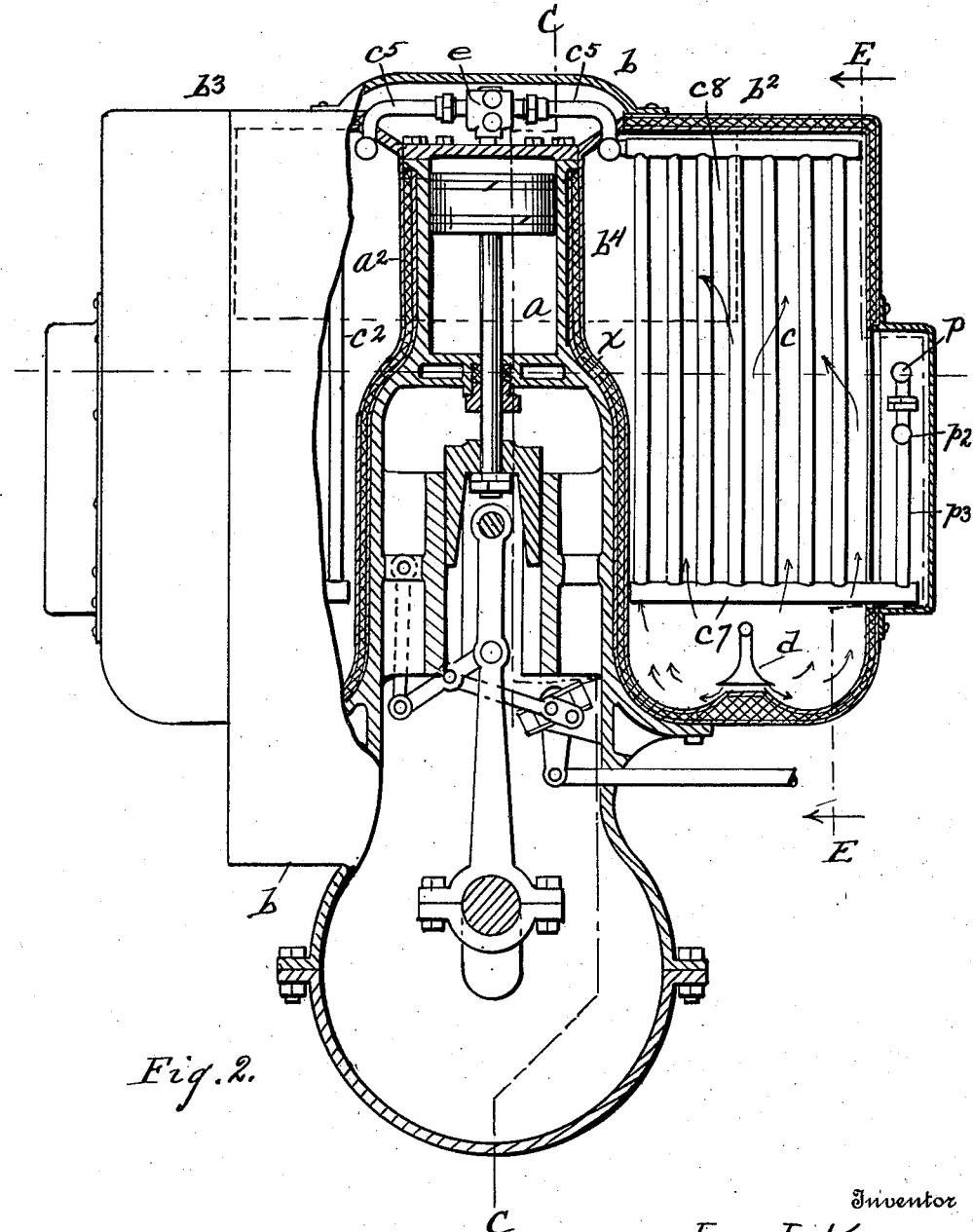
Fig. 2 is an end elevation partly in section in the plane indicated by the line 2—2 Fig. 1.
Figure 5:
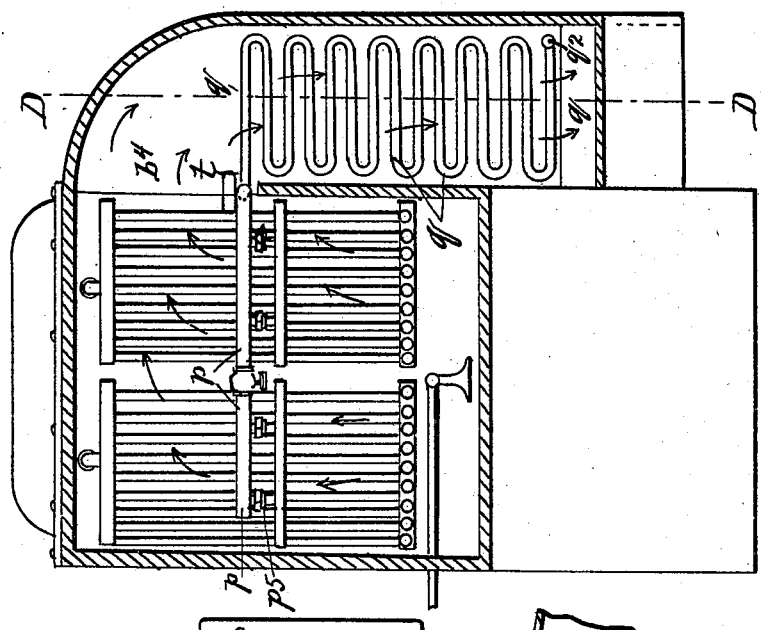
Fig. 5 is a side elevation partly on the line E—E Figs. 2 and 9.
Figure 4:
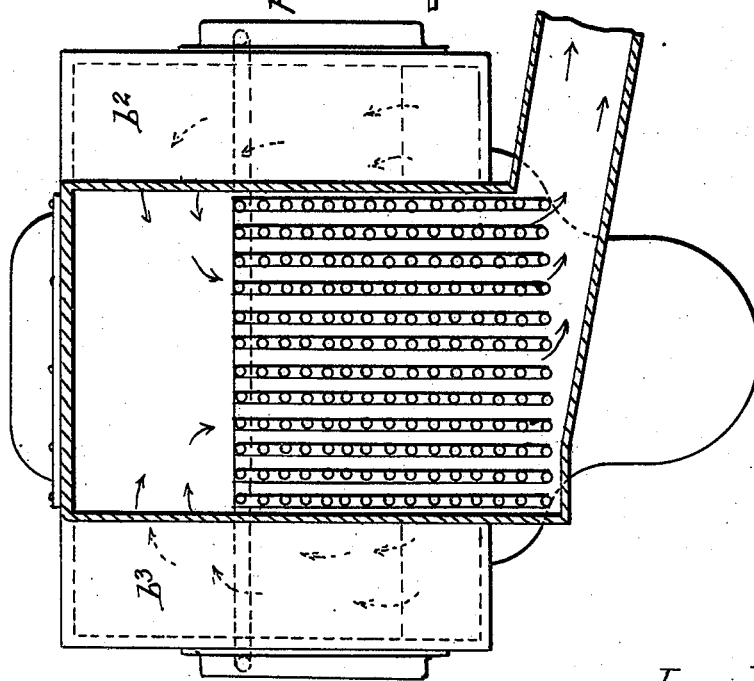
Fig. 4 is an end elevation partly in section on the line D—D Fig. 1.

$q$ is the economizer for the feed water, this is located in the flue $b^4$ so that it shall be exposed to the hot gases passing out through said flue. It consists of a number of pipes, each of which is bent into a number of coils in a single plane as shown, to which the water is fed and from which it passes to the supply pipes $p$ and thence to the generators as above described. There are a number of such pipes placed side by side in parallel planes, each of said pipes is welded at one end to receiving manifold $q^2$ (Fig. 5) and at the other end to a delivery manifold to which latter is connected by a union joint (Fig. 9) to each of the manifolds $p$. $p^4$ is a shut-off valve by which one of the generators may be isolated.

$h$ is a supply tank for containing water to feed to the generator. $i$ is a connecting pipe leading from the tank $h$ to the economizer $q$. $j$ is a feed pump interposed in the pipe $i$ and acting to draw water from the tank $h$ and force it toward the economizer $q$.

$k$ is a casing with which the pipe $i$ leading from the pump $j$ communicates at its lower end. $v$ is a return pipe communicating with the upper part of the casing $k$ and with the pipe $g$ leading to the tank $h$. There is a valve and valve seat $s$ interposed in the casing $k$ between the pipes $i$ and $o$. $r$ is a pipe leading to the economizer $q$. This pipe leads from the casing $k$ below the valve and seat $s$ and is provided with a non-return valve $r^2$ opening toward the economizer.

$m$ is an inclosed casing communicating by a pipe $t$ with the generator or boiler at the level of the water therein. In the casing $m$ is a thermostat indicated as an inclosed mercury chamber $m^2$ with a flexible wall. This thermostat communicates by a transmission mechanism $m^3$ of conventional type with the valve $s$. Any proper thermostat may be used, the form shown is merely illustrative and is intended merely to indicate the location and connection of such an apparatus.

The operation of the feed mechanism is as follows:

The pump $j$ is continuously operating. When steam enters the casing $m$ and consequently the temperature of the thermostat is high, the valve $s$ is brought against its seat so as to shut off communication between the pipes $i$ and $v$. Under these conditions the pump $j$ forces the water into the casing $k$ and through the pipe $r$ to the economizer and boiler or generator. When the water has risen above the pipe $t$ it runs into the casing $m$ and the temperature of the casing falls opening the valve $s$ whereupon the water forced into the casing $k$ by the pump $j$ passes through the pipe $v$ and is returned to the tank $h$. Thus the level of the water in the generator is automatically maintained.

The delivery manifold $p$ of the economizer is located at the level of the water in the generator so that the tipping of the vehicle shall not cause a material change of water level in the generator.

The exhaust passes through the passage $a^3$ to a manifold $a^5$ located below the current of cooling air passing through the condenser from which manifold lead a large number of small pipes passing up through said current and communicating with the upper part of the radiator, or condenser, $f$, the fan drawing air through the radiator and past the pipe $a^4$ containing the exhaust steam and water. Water of condensation is returned by the pipe $g$ to the tank $h$ and again used.

The gases surrounding the cylinders will be always hotter than the steam passing into and through the same and the insulation should be so adapted that it will present the proper heat gradient so that the interior walls of the cylinders will be under usual working conditions always a little hotter than the steam and the steam will carry off the heat furnished by the walls of the cylinders as fast as the heat passes through the walls and insulation.

By this arrangement cylinder condensation is entirely obviated, the interior walls of the cylinder do not become too hot for the lubricant.

It will be observed that the cylinder is entirely inclosed in the casing.

Each of the generators and the economizers presents a unitary structure and each is secured in place by three points of suspension, the generator by the unions $p^5$ by which they are connected to the manifold $p^2$ and by the union in the steam supply pipe $c^5$ (Figs. 7 and 6). The economizer is connected by two unions $p^6$ and by the supply pipe $r$ engaging the wall of the casing.

The exhaust steam of the engine is led up through the current of cooling air to the radiator and in the radiator down through the current of cooling air. By this construction the exhaust steam is passed twice through this current of cooling air.

The feed of the water does not depend upon an overflow but by the direct delivery of a forced pump at the plane of the water level.

The above described insulation upon the cylinders will be such that from the time of applying heat to the time the maximum boiler pressure is reached the cylinders will not heat to a temperature above that of the steam at such maximum pressure.

What I claim is:

1. In a power plant, the combination of a steam cylinder having an interior wall adapted to form a bearing surface for a piston, a power receiving and imparting piston adapted to reciprocate in said cylinder bearing against said surface, means for supplying steam to said cylinder to impart power to said piston and exhausting the same from said cylinder, means for applying a high temperature to the exterior wall of said cylinder opposite and adjacent to said bearing surface, and heat insulating means interposed between said source of high temperature and said bearing surface, the quality of said insulator by which the flow of heat is obstructed being such that the heat shall be supplied through the wall of the cylinder to the interior surface thereof at the rate that the heat is withdrawn from said interior surface in the normal working of the engine.

2. In a power plant, the combination of a steam cylinder having an interior wall adapted to form a bearing surface for a piston, a power receiving and imparting piston adapted to reciprocate in said cylinder bearing against said surface, means for supplying steam to said cylinder to impart power to said piston and exhausting the same from said cylinder, means for applying a high temperture to the exterior wall of said cylinder opposite and adjacent to said bearing surface, and heat insulating means interposed between said source of high temperature and said bearing surface, the quality of said insulator by which the flow of heat is obstructed being such that the heat shall be supplied through the wall of the cylinder to the interior surface thereof at the rate that the heat is withdrawn from said interior surface in the normal working of the engine, said insulator being in the form of a covering applied directly to the outer wall of said cylinder and therefore forming a part of the composite wall of said cylinder.

3. In a power plant, the combination of a steam cylinder, a power receiving and imparting piston adapted to reciprocate in said cylinder, means for supplying steam to said cylinder and exhausting the same therefrom to impart power to said piston, means for applying a high temperature to the exterior wall of said cylinder, and a heat insulator so located and constructed that the heat flow through the wall of said cylinder shall be at the rate that heat is withdrawn from the interior wall of said cylinder in the normal operation of the engine.

4. In a power plant, the combination of a steam cylinder, a power receiving and imparting piston adapted to reciprocate in said cylinder, means for supplying steam to said cylinder and exhausting the same therefrom to impart power to said piston, means for applying a high temperature to the exterior wall of said cylinder, and a heat insulator so located and constructed that the heat flow through the wall of said cylinder shall be at the rate that heat is withdrawn from the interior wall of said cylinder in the normal operation of the engine, said insulator being in the form of a covering applied to the exterior wall of said cylinder and therefore forming a part of the composite wall of said cylinder.

In testimony whereof, I sign this specification.

LEO I. KELLY.